United States Patent
Strauch et al.

(10) Patent No.: US 8,441,393 B2
(45) Date of Patent: May 14, 2013

(54) ORTHOGONAL FREQUENCY DIVISION MULTIPLEXING (OFDM) RADIO AS RADAR

(75) Inventors: Paul Strauch, Laguna Niguel, CA (US); Soumya K. Nag, San Marcos, CA (US); Farrokh Mohamadi, Irvine, CA (US)

(73) Assignee: Tialinx, Inc., Newport Beach, CA (US)

( * ) Notice: Subject to any disclaimer, the term of this patent is extended or adjusted under 35 U.S.C. 154(b) by 413 days.

(21) Appl. No.: 12/796,635

(22) Filed: Jun. 8, 2010

(65) Prior Publication Data

US 2011/0193739 A1  Aug. 11, 2011

Related U.S. Application Data

(60) Provisional application No. 61/303,234, filed on Feb. 10, 2010.

(51) Int. Cl.
*G01S 13/06* (2006.01)
*H04L 1/02* (2006.01)
*H04L 27/00* (2006.01)

(52) U.S. Cl.
USPC .............................. 342/60; 342/118; 375/316

(58) Field of Classification Search ............... 342/60
See application file for complete search history.

(56) References Cited

U.S. PATENT DOCUMENTS

| | | | |
|---|---|---|---|
| 7,551,118 B2 * | 6/2009 | Hellsten ..................... | 342/25 R |
| 7,994,969 B2 * | 8/2011 | Van Caekenberghe et al. ............................. | 342/200 |
| 8,081,105 B2 * | 12/2011 | Tigrek et al. ................. | 342/105 |
| 2005/0195103 A1* | 9/2005 | Davis et al. ................... | 342/99 |

OTHER PUBLICATIONS

Franken, G.E.A.; Nikookar, H.; van Genderen, P.; , "Doppler Tolerance of OFDM-coded Radar Signals," Radar Conference, 2006. EuRAD 2006. 3rd European, pp. 108-111, Sep. 13-15, 2006.*

Levanon, N.; , "Multifrequency complementary phase-coded radar signal," Radar, Sonar and Navigation, IEE Proceedings—, vol. 147, No. 6, pp. 276-284, Dec. 2000.*

Niktash, A.; Maestre, R.; Bagherzadeh, N.; , "A case study of performing OFDM kernels on a novel reconfigurable DSP architecture," Military Communications Conference, 2005. MILCOM 2005. IEEE , pp. 1813-1818 vol. 3, Oct. 17-20, 2005.*

Sebt, M.A.; Sheikhi, A.; Nayebi, M.M.; , "Orthogonal frequency-division multiplexing radar signal design with optimised ambiguity function and low peak-to-average power ratio," Radar, Sonar & Navigation, IET , vol. 3, No. 2, pp. 122-132, Apr. 2009.*

Stralka, John Paul. "Applications of Orthogonal Frequency-Division Multiplexing (OFDM) to Radar." The Johns Hopkins University, Mar. 2008.*

WiMedia Alliance, Multiband OFDM Physical Layer Specification, PHY Specification: Final Deliverable 1.5, Aug. 11, 2009, pp. 1-204, http://www.wimedia.org/en/index.asp.

(Continued)

*Primary Examiner* — Matthew M Barker
(74) *Attorney, Agent, or Firm* — Haynes and Boone, LLP

(57) ABSTRACT

An orthogonal frequency division multiplexing (OFDM) communication system is adapted for radar ranging and imaging. A radar system includes an orthogonal frequency division multiplexing (OFDM) radio communications transmitter configured to transmit information bits using one or more payload symbols in a transmitted signal; and a receiver configured to: construct the payload symbols from the information bits provided by the transmitter; receive the payload symbols in the transmitted signal reflected from a target; apply a matched filter to the received payload symbols using the constructed payload symbols as a template; and process a magnitude response at an output of the matched filter for estimating location and imaging of the target.

17 Claims, 10 Drawing Sheets

OTHER PUBLICATIONS

Http://www.wirelessshd.org/, WirelessHD Specification Overview, Aug. 27, 2009, pp. 1-77 ver. 1.0a.

D.S. Garmatyuk, Simulated Imaging Performance of UWB SAR based on OFDM, IEEE Ultra-Wideband 2006 International Conf., Sep. 24-27, 2006, pp. 237-242.

D.S. Garmatyuk et al., Feasibility Study of a Multi-Carrier Dual-Use Imaging Radar and Communication System, Proceedings of $4^{th}$ European Radar Conf., Oct. 2007, pp. 194-197, Munich, Germany.

D.S. Garmatyuk, High-Resolution Radar System Modeling With MATLAB/SIMULINK, rfDesign, www.rfdesign.com, Aug. 2006, pp. 12-19.

Sen et al., Adaptive Design of OFDM Radar Signal with Improved Wideband Ambiguity Function, IEEE Trans. Signal Processing, Feb. 2010, pp. 928-933, vol. 58, No. 2.

J.M. Gilbert et al., A 4-GBPS Uncompressed Wireless HD A/V Transceiver Chipset, IEEE Comp. Society, 2008, pp. 56-64, http://www.sibeam.com/whtpapers/IEEE__Micro08__SiBEAM__4Gbps__Uncompressed__Wireless__HD__AV__Transsceiver__Chipset2-1.pdf.

G. Baldwin et al., Proposal for HD AV and data support, IEEE P802.15 Working Group for Wireless Personal Area Networks (WPANs), TB3c presentation, May 7, 2007, pp. 1-40.

* cited by examiner

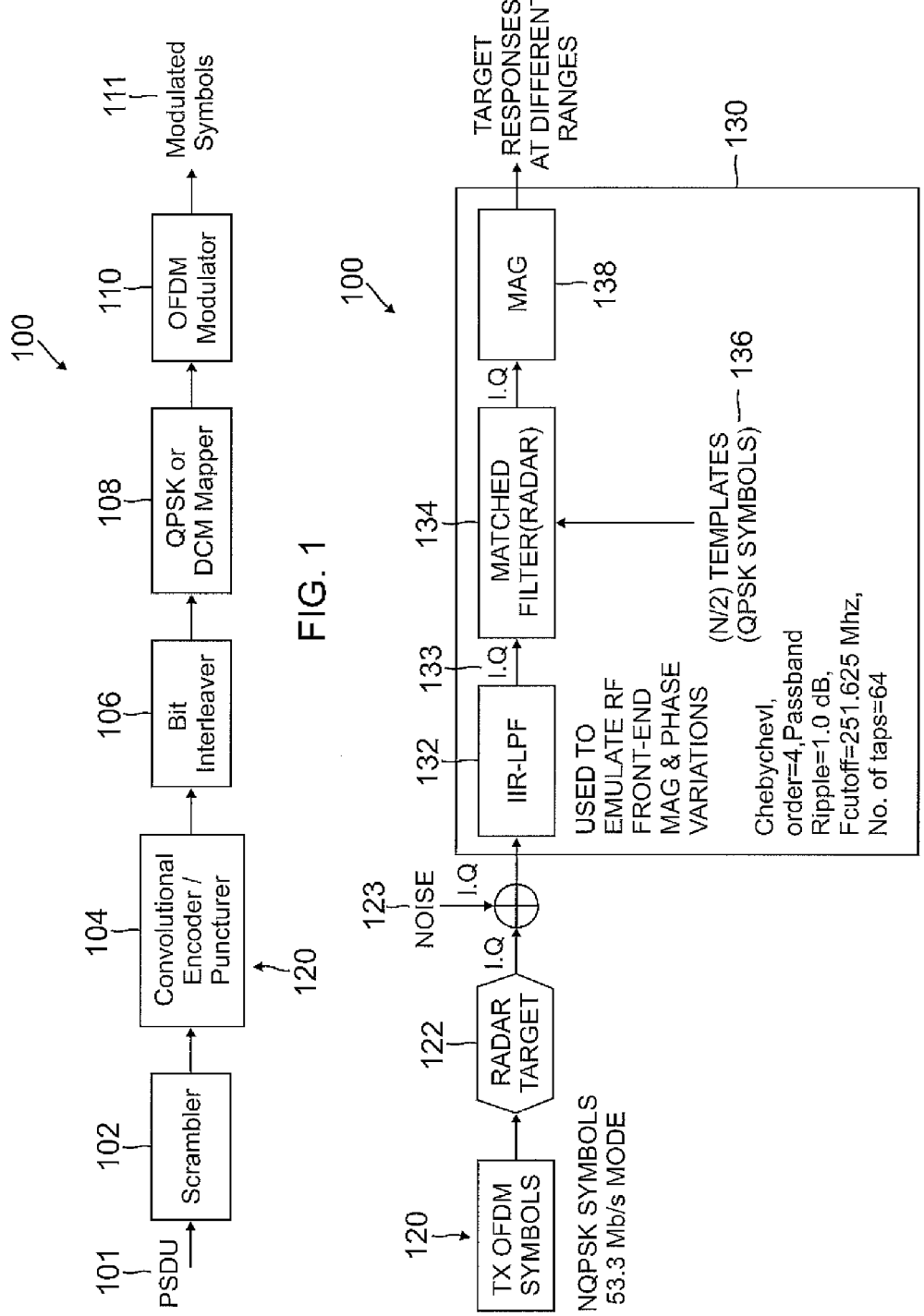

ORTHOGONAL FREQUENCY DIVISION MULTIPLEXING (OFDM) RADIO AS RADAR

CROSS REFERENCE TO RELATED APPLICATIONS

This application claims the benefit of U.S. Provisional Application No. 61/303,234, filed Feb. 10, 2010 and incorporated by reference.

BACKGROUND

The present disclosure generally relates to radar surveillance systems for detection and imaging of concealed individuals and objects and, more particularly, to adapting radio communication electronics and signals developed for wireless personal area and wireless video area networks (WPAN and WVAN) to ultra-wideband (UWB) radar ranging and imaging.

Ultra-wide band (UWB) technology has come into use for helping to satisfy an increasing demand for wireless communication at high data rates between a variety of personal computer (PC) and consumer electronics products. The WiMedia™ Alliance is a global nonprofit organization that defines, certifies, and supports wireless technology that enables multimedia data transfers at high-speed (480 megabits per second (Mbps) and beyond) with low power consumption in a wireless personal area network (WPAN). WiMedia's UWB technology offers end users wireless freedom and convenience in a broad range of PC and consumer electronics products. These products include Wireless USB™ docking stations, hard drives, projectors and laptop to HDTV (high-definition television) audio/video extenders. The WiMedia™ Alliance also focuses on providing specifications for streaming video applications. The WiMedia™ UWB common radio platform incorporates media access control (MAC) layer and physical (PHY) layer specifications based on multi-band orthogonal frequency division multiplexing (MB-OFDM) and operates in the 3.1 to 10.6 GHz UWB spectrum.

Also, there has recently been increasing demand for a wireless video area network (WVAN) for combining uncompressed high-definition video, multi-channel audio, intelligent format and control data, and "Hollywood"-approved standard content protection techniques. A core technology is based on the 60 GHz millimeter-wave frequency band, which promotes theoretical data rates as high as 25 gigabits per second (Gbps), permitting it to scale to higher resolutions, color depth, and range. Among 60-GHz communication standards that use OFDM are: IEEE 802.15.3c, ECMA 387, WiGig, and IEEE 802.11ad. The WirelessHD® Consortium is an industry-led effort to define a worldwide standard specification for providing solutions for WVAN networking. For end-users, elimination of cables for audio and video dramatically simplifies home theater system installation and eliminates the traditional need to locate source devices in the proximity of the display. The WirelessHD® specification has been architected and optimized for wireless display connectivity, achieving in its first generation implementation high-speed rates up to 4 Gbps at ten meters non-line-of-sight for consumer electronics, personal computing, and portable device products.

Like WiMedia™ UWB technology, the WirelessHD® PHY is also based on OFDM, with an instantaneous modulation bandwidth, however, that is three and half times greater than that of the WiMedia™ OFDM system. The requirement for high data throughput at distances of 10 meters requires a large allocated frequency spectrum. A large amount of spectrum is available on an unlicensed basis in many countries in the 60 GHz band. In North America and Japan, a total of 7 GHz in each country is allocated for use, 5 GHz of which is overlapping. The band 57~64 GHz is allocated in North America while 59-66 GHz is allocated in Japan. In addition, Korea and the European Union have allowed similar allocations. The regulating agencies allow very high effective transmit power (the combination of transmitter power and antenna gain), e.g., greater than 10 Watts (W) of effective isotropic radiated power (EIRP). High EIRP and wide allocated bandwidth can allow high throughput connections that are, however, very directional.

SUMMARY

According to one embodiment, a radar system includes an orthogonal frequency division multiplexing (OFDM) radio communications transmitter configured to transmit information bits using one or more payload symbols in a transmitted signal; and a receiver configured to: construct the payload symbols from the information bits provided by the transmitter; receive the payload symbols in the transmitted signal reflected from a target; apply a matched filter to the received payload symbols using the constructed payload symbols as a template; and process a magnitude response at an output of the matched filter for estimating location and imaging of the target.

According to another embodiment, a method includes: transmitting an orthogonal frequency division multiplexing (OFDM) modulated signal comprising information bits conveyed by one or more payload symbols; constructing the payload symbols from the information bits provided to a receiver; receiving the payload symbols in the transmitted signal reflected from a target; applying matched filtering to the received payload symbols using the constructed payload symbols as a template; and processing a magnitude response at a matched filter output to produce a range estimate of the target.

According to another embodiment, an orthogonal frequency division multiplexing (OFDM) radio includes an OFDM radio communications transmitter configured to: transmit information bits using one or more payload symbols in a transmitted signal; and provide the information bits from a physical layer service access point (PHY SAP); and also includes a receiver configured to: construct the payload symbols from the information bits provided by the transmitter; receive the payload symbols in the transmitted signal reflected from a target; apply a matched filter to the received payload symbols using the constructed payload symbols as a template; and process a magnitude response at the matched filter output for ranging and imaging of the target.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 1 is a system block diagram of an example of part of an OFDM radio transmitter in accordance with one embodiment;

FIG. 2 is a block diagram showing a radar system and radar ranging operation utilizing OFDM radio in accordance with one embodiment;

Embodiments and their advantages are best understood by referring to the detailed description that follows. Like reference numerals are used to identify like elements illustrated in one or more of the figures.

DETAILED DESCRIPTION

Figure 3:
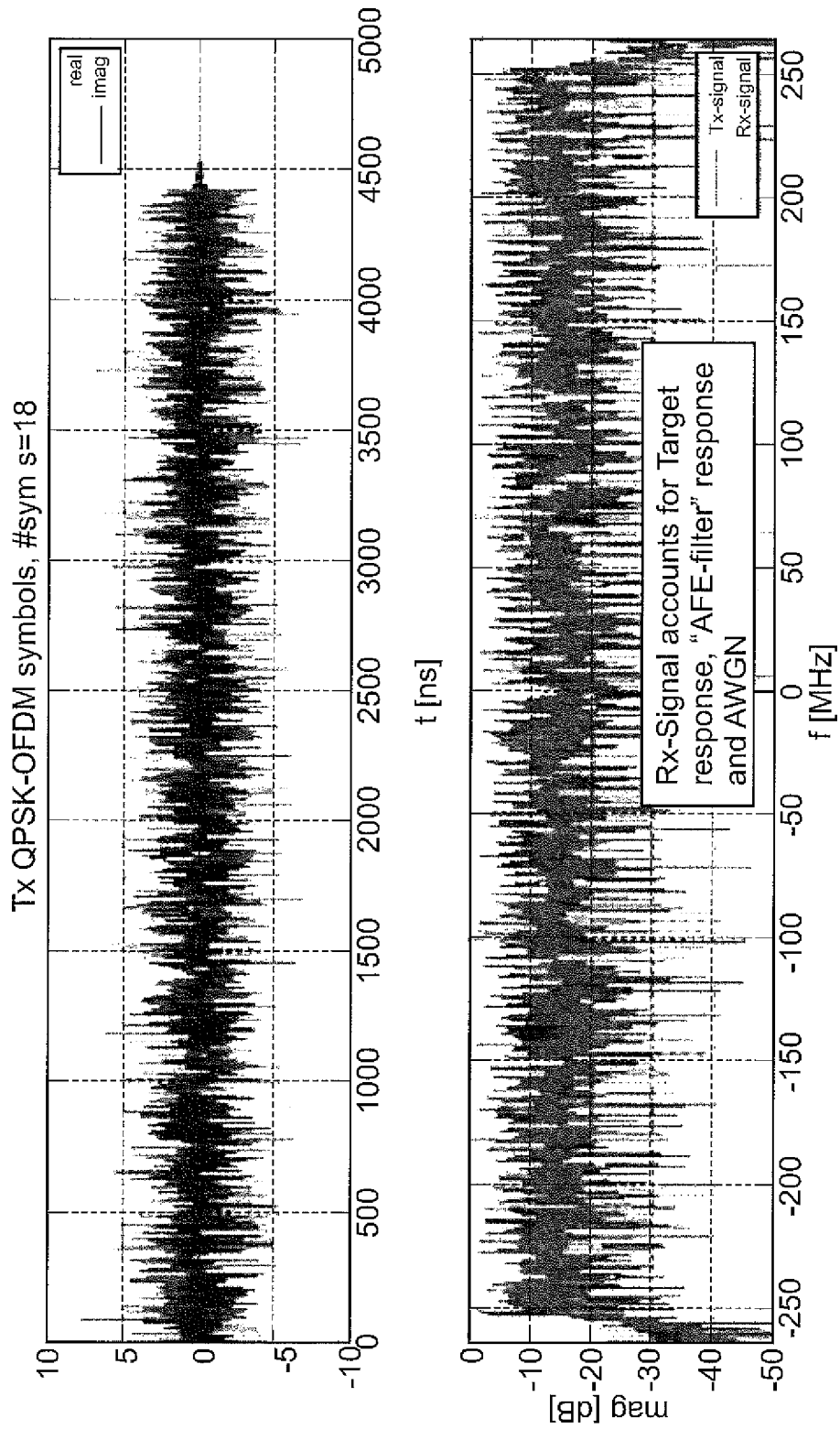
FIG. 3 is a magnitude vs. time plot for transmitted OFDM symbols (top) and magnitude vs. frequency plot of response of corresponding transmitted and received symbols including target and filter response, and noise (bottom) in accordance with one embodiment.

Embodiments of the present invention provide ultra-wideband (UWB) radar ranging and imaging systems using orthogonal frequency division multiplexing (OFDM) radio systems such as specifically commercially available WiMedia™ and WirelessHD® systems-on-chip (SoC), with certain digital baseband receiver modifications. Because such systems have been developed for the consumer electronics markets, they are generally available in volume quantities at reasonably low price. Hence, these commercially available OFDM transceivers can be used to implement inexpensive high-resolution UWB radars. The 60-GHz communication standards other than WirelessHD® all have a single carrier transmission option in addition to using OFDM. Single carrier transmission may be used for lower data rates and has a lower peak-to-average-power-ratio (PAPR) than OFDM. Therefore, single carrier transmission may be more power efficient (e.g., may have less power amplifier back-off). So, single carrier transmission—usually with frequency domain equalization (FDE)—may be suitable for portable devices and can be used for radar applications as well.

Such inexpensive, high resolution UWB radars may be portable and may be useful for dynamically scanning for objects (e.g., ordnance or vehicles) behind a wall, both from moving vehicles, on-road and off-road, and from the ground, and to statically locate internal structural details of buildings or other structures. Such a radar system may be useful, for example, to persons (e.g., fire, rescue workers, military, police) needing information in situations involving their safety where other sources of information are unavailable or unreliable. Such UWB radar imaging systems also may be valuable for surveillance to protect an inhabitable area—an office space or living space, for example—with the detection system located inside the space, from individuals behind a building wall and having access to hallways or areas nearby but outside the space. A similar but alternative scenario may be one in which the space under surveillance is protected by a covert detection system hidden from the space, located outside the space behind a wall. In addition, very high frequency, e.g., 60 gigahertz (GHz) or millimeter-wave, UWB radar imaging systems may be used to identify and differentiate multiple individuals, track the individuals' motion and display the tracking in real time, and identify objects, such as concealed weapons or contraband, that may be carried by any of the individuals.

An example of an embodiment for WiMedia™ radios as UWB radar is presented followed by an example of an embodiment for WirelessHD® radios as UWB radar ranging and imaging systems. Calculations showing feasibility of the various embodiments may be aided or obtained, for example, using simulation.

FIG. 1 illustrates a transmitter portion of a radar system 100 using an OFDM radio transmitter 120 in accordance with one embodiment. As shown in FIG. 1, radar system 100 may include a scrambler unit 102 that receives information bits 101 as input. Information bits 101 may include or be included in a physical layer convergence protocol (PLCP) service data unit (PSDU) as specified, for example, by a WiMedia™ Alliance physical layer (PHY) specification. A transmitter portion 120 of radar system 100 may also include a convolutional encoder/puncturer 104, bit interleaver 106, mapper 108—which may provide, for example, quadrature phase shift keying (QPSK), dual carrier mapping (DCM), or higher order modulation—and OFDM modulator 110, with each module providing its output to the input of the next module, as shown in FIG. 1, with OFDM modulator 110 providing modulated symbols 111 at its output as shown.

One embodiment using OFDM radio for UWB radar ranging may be concisely summarized as applying a pulse-compression (matched filtering) technique on received payload symbols ("payload" pertaining to, e.g., symbols conveying information other than packet headers and guard intervals, for example) by using the transmitted payload symbols (e.g., symbols 111) as the matched filter template, followed by a "pulse integration approach" to help improve the signal-to-noise ratio (SNR). The magnitude responses of the pulse-compressed signals, which provide high range resolution, may be used for moving or static target detection. A significant feature employed by one embodiment is that the information bits 101 (e.g., PSDU data units) provided at the physical layer (PHY) service access point (SAP or PHY SAP) for transmission is known to the "radar receiver" (e.g., modified OFDM receiver) based on which the corresponding OFDM symbol templates can be generated from the specific scrambled, encoded and interleaved bits at the interleaver 106 output or OFDM modulator 110 input.

Transmitter 120 may be implemented using an application specific integrated circuit (ASIC). In the transmitter ASIC, the interleaver 106 output bit sequence may be inaccessible. Based, however, on WiMedia™ specifications for the scrambler 102, encoder/puncturer 104, and interleaver 106, it may be possible to generate the specific bit sequence a priori at the output of the interleaver 106 for a specific bit sequence of information bits 101 provided at the PHY SAP, that would match the interleaver 106 output in the hardware. Once the specific bit pattern at the interleaver 106 output is generated, QPSK or dual carrier modulation (DCM) may be applied prior to sub-carrier mapping in the OFDM Modulator, per WiMedia™ specifications. The first example embodiment presented in what follows is based on an analysis using the lowest WiMedia™ data rate mode of 53.3 Mbps, which utilizes QPSK modulation with frequency domain spreading (FDS) and time domain spreading (TDS). Due to TDS, the transmitted payload symbol $s_1$ may be identical to $s_2$, $s_3$ may be identical to $s_4$, $s_5$ may be identical to $s_6$, and so on. Hence, if N payload symbols are transmitted, then there may be only (N/2) distinct symbols (e.g., statistically independent of each other), and thus only (N/2) templates may be needed as indicated in FIG. 2.

FIG. 2 illustrates a system implementation of one embodiment of a radar system 100 utilizing OFDM radio transmitter 120 and receiver 130. The following parameters and conditions are assumed for the analysis of the first example embodiment of OFDM radio as UWB radar based on WiMedia™ specifications.

Modulation Bandwidth=528 MHz
Total number of subcarriers=128
   100 Data subcarriers
   12 Pilot subcarriers
   10 Guard subcarriers
   6 Null subcarriers
Subcarrier frequency spacing=4.125 MHz
Effective Bandwidth=503.25 MHz (this implies the radar-range resolution=0.98 feet (ft))
IFFT (transmitter) and FFT (receiver) period=242.24 ns
Number of samples in zero-padded suffix=37 ($N_{zps}$)
Symbol period=312.5 nanoseconds (ns) (including $N_{zps}$ samples)
Lowest 53.3 Mbps PHY rate—
   QPSK modulation
   Coding Rate 1/3
   Frequency Domain Spreading
   Time Domain Spreading
   Coded bits per 6 OFDM Symbols=300 ($N_{CBP6S}$)
   Information bits per 6 OFDM Symbols=100 ($N_{IBP6S}$)
   Maximum number of transmitted symbols (coded) per Frame Payload=660
   Minimum required SNR≈−4.4 dB (assuming coding gain is +5 dB)

Although the first example embodiment uses the lowest WiMedia™ data rate with QPSK modulation, OFDM radio as UWB radar implementations may also be provided using the PSDU rate-dependent parameters for higher data rates, e.g., 80 Mbps, 106.7 Mbps, 160 Mbps, 200 Mbps, 320 Mbps, 400 Mbps and 480 Mbps.

In addition to the significant feature employed by one embodiment that the specific bit pattern at the interleaver 106 output can be constructed based on the specific PSDU data (e.g., information bits 101) at the scrambler 102 input, some further features that may be employed by the first example embodiment of radar system 100 of OFDM radio for UWB-radar ranging are:

Feature 1) Samples may be extracted at the output of the analog-to-digital converter (ADC) in the receiver physical layer system-on-chip (PHY-SoC) from a particular WiMedia™ vendor. These samples may be used to generate the UWB radar pulses for ranging and imaging.

Feature 2) The ADC output samples may be extracted at the rate of 1024 mega-samples per second (Msps), or at least 512 Msps, via an appropriate interface to a suitable field programmable gate array (FPGA) or digital signal processing (DSP) processor for real-time processing.

Feature 3) The start of the extracted samples from the ADC output should correspond to the start of the frame payload symbols. This synchronization may allow the removal of zero padded suffix samples (ZPS) per OFDM payload and, thereby, the matched filtering to take place only on the data samples past the ZPS. This information on start of frame payload ensures that no ADC samples corresponding to PLCP preamble and PLCP header are used for the radar matched filtering. A variety of functions are served by the PLCP preamble, such as initial timing synchronization, carrier frequency offset coarse and fine estimation and compensation, channel estimation, and automatic gain control (AGC). Moreover, capturing the ADC output samples corresponding to the beginning of the frame payload ensures that suitable gain control to the ADC full-scale has been applied via the AGC algorithms. Data collection corresponding to the beginning and end of the frame payload can be controlled by the MAC layer. If the information on the beginning of the frame payload is not available, but timing information at a specific sample or samples in the preamble or header is available instead, the beginning sample of the frame payload can be obtained based on the a priori knowledge of the specific samples (e.g., symbols) constituting the packet/frame synchronization sequence and channel estimation sequence in a PLCP preamble, or specific samples (symbols) constituting a PLCP header.

Feature 4) Ranging (time of arrival) functionality may be required if the true time of arrival of the initial radar reflections from a scatterer (e.g., stationary or moving target) is needed. The subsequent time-delayed radar ranging information from other scatterers (stationary or moving) relative to the first response can still be obtained from the pulse compression algorithm output signal, regardless of whether the ranging functionality is supported or not. According to the WiMedia™ PHY specification, ranging refers to determining the round trip delay between a device and another device. The distance can be estimated by multiplying the speed of light by the measured propagation delay between the devices. The ranging functionality may be supported by the MAC and PHY layers. In addition, this feature may help determine the absolute time of arrival (TOA) of the scatterers when the transmitter and receiver are in monostatic radar mode or bistatic radar mode. The delayed reflection responses from other scatterers and their relative timing with respect to the first TOA, will be available from the matched filter output in the radar receiver 130. If the ranging functionality is not supported by a particular SoC, then the antenna coupling between the transmitter and the receiver antennas may be used as the initial radar-range time reference, based on which delayed radar ranges from multiple scatterers (stationary or static) can be extracted from the pulse compression (matched filter) algorithm output. According to the WiMedia™ PHY specification: "if ranging is supported, all devices shall support ranging capabilities with an accuracy and precision of ±60 cm (±2 ft) or better."

Returning to FIG. 2, system operation for UWB radar-ranging, in the baseband, is shown for one embodiment of a radar system 100 utilizing an OFDM radio transmitter 120 and a receiver 130. Transmitter 120—labeled "TX OFDM SYMBOLS"—may transmit the transmitted frame payload, which may be transmitted in the form of modulated symbols 111 (see FIG. 1). The transmitted symbols may comprise N distinct QPSK symbols and may be transmitted at the lowest WiMedia™ data rate mode of 53.3 Mbps as indicated in FIG. 2.

Radar target 122 may be a scatterer of the transmitted radar signal, which may be, for example, either stationary (e.g., walls, ground surface, ground-buried targets) or moving (e.g., persons, animals). Assuming, as in Feature 3) above, that the ADC output samples correspond to the beginning of the frame payload, the samples may contain wireless channel multipath or radar-echo responses, as well as band-limited magnitude and phase responses of the transmitter 120 and receiver 130 radio frequency (RF) front end 132. Such RF front-end magnitude and phase variation may be calculated using an infinite impulse response (IIR) low pass filter ("IIR-LPF") parameters to represent RF front end 132. For the first example embodiment, the IIR-LPF of receiver RF front end 132 may comprise a Chebyshev type I filter, with order=4, pass-band ripple=1.0 dB, cut-off frequency at 251.625 MHz, and 64-tap impulse response.

Matched filter 134—labeled "MATCHED FILTER (RADAR)"—may include a matched filtering or pulse compression technique applied to OFDM symbols 133 output, for example, by receiver front end 132. For the matched filter templates 136, the OFDM symbols corresponding to the interleaver 106 output (in the transmitter 120), known a priori, are used. These template symbols 136 do not contain the cyclic prefix (CP). The matched filter 134 serves as a pulse compressor—e.g., although the OFDM symbols at the filter input are much longer than the relative time-delays between radar echoes, the filter output exhibits strong, correlated responses (I (in-phase) and Q (quadrature)) with width approximately equal to the reciprocal of the effective bandwidth. For the first example embodiment, the effective bandwidth is, for example, 503.25 MHz=122 (the number of non-null subcarriers)×4.125 MHz (the subcarrier frequency spacing). Thus, the radar range resolution may be limited to approximately 0.98 ft. The magnitude response ($I^2+Q^2$) 138 at the matched filter 134 output can provide high-resolution signals that may be processed further for estimating radar-target locations as well as target (stationary or moving) imaging.

For the first example embodiment, the data rate of 53.3 Mbps has been used along with FDS and TDS. Because of TDS (e.g. spreading factor of 2), each two successive OFDM symbols may be identical (e.g., symbol $s_1$ is identical to symbol $s_2$, symbol $s_3$ is identical to $s_4$, and so on.) Thus, for N number of transmitted symbols, only (N/2) distinct corresponding template symbols 136 are required, as indicated in FIG. 2. The matched filter 134 can be generalized for higher data rates, however, for which TDS is not used, in which case N distinct template symbols may be needed. Also, for the first example embodiment, the complex-valued impulse response h[n] of the target echoes 122 (e.g., equivalent baseband modeling) has been chosen to be:

$$h[n]=[\{(1+j)/\sqrt{2}\}\cdot\delta[n]\{(1-j)/\sqrt{2}\}\cdot\delta[n-n_0]+\{(-0.5-j0.5)/\sqrt{2}\}\cdot\delta[n-n_1]]$$

where $n_0$ and $n_1$ denote the sample index corresponding to the time delays of the first and second echoes (reflections) with respect to the first reflection. For analysis, time delays $t_0$ and $t_1$ have been selected from which $n_0$ and $n_1$ are computed using the formula: $n_i$=floor[($t_i$/dt], where dt=$T_{sym}$/N=(1/df)/N=(1/4.125e6)/128=1.8939e-9 sec, and i=0, 1.

FIG. 3 is a pair of magnitude plots for the first example embodiment. Eighteen complex valued (e.g., I, Q pairs), transmitted OFDM symbols (e.g., symbols 111) are shown in the top plot of FIG. 3. The bottom plot of FIG. 3 shows the magnitude frequency response of corresponding transmitted and received symbols. The received symbols, convolved with target impulse response, analog front end ("AFE-filter") impulse response, and with additive white Gaussian noise (AWGN) 123 (see FIG. 2) are also shown. For the particular 53.3 Mbps rate for the first example embodiment, the minimum required SNR at the receiver RF front-end input is approximately −5.0 dB. Therefore, the noise variance in the AWGN 123 was set accordingly for analysis. The spectral dips in the received signal frequency response seen in the bottom plot of FIG. 3 are apparent due to target and "AFE-filter" impulse responses.

Figure 4:
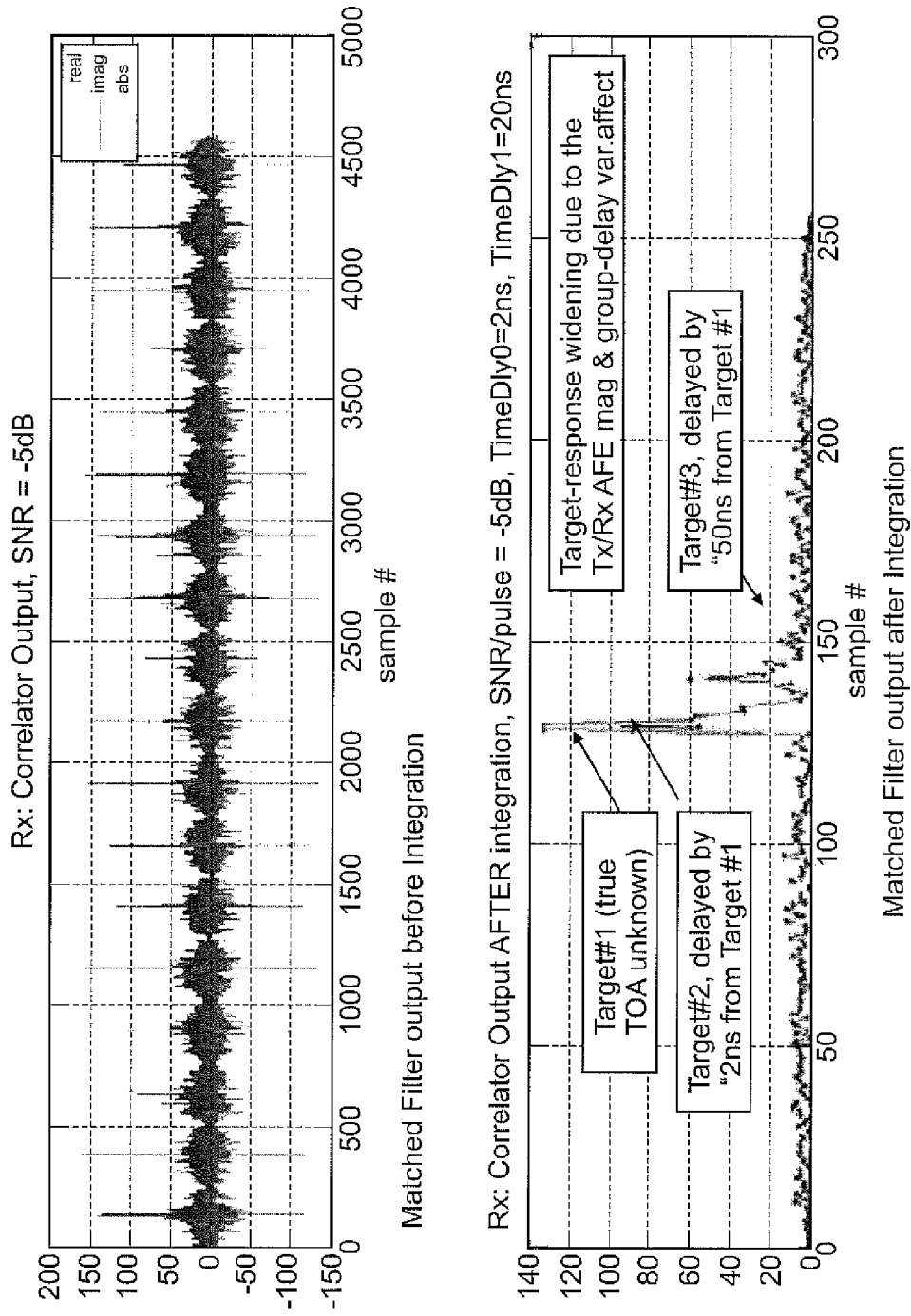
FIGS. 4, 5, and 6 are each a pair of magnitude vs. sample number plots for eighteen consecutive correlated symbols before (top) and after (bottom) integration of matched filter output, the different figures showing an example of the effects of different target distances and timing relationships between signals, in accordance with one embodiment.
Figure 5:
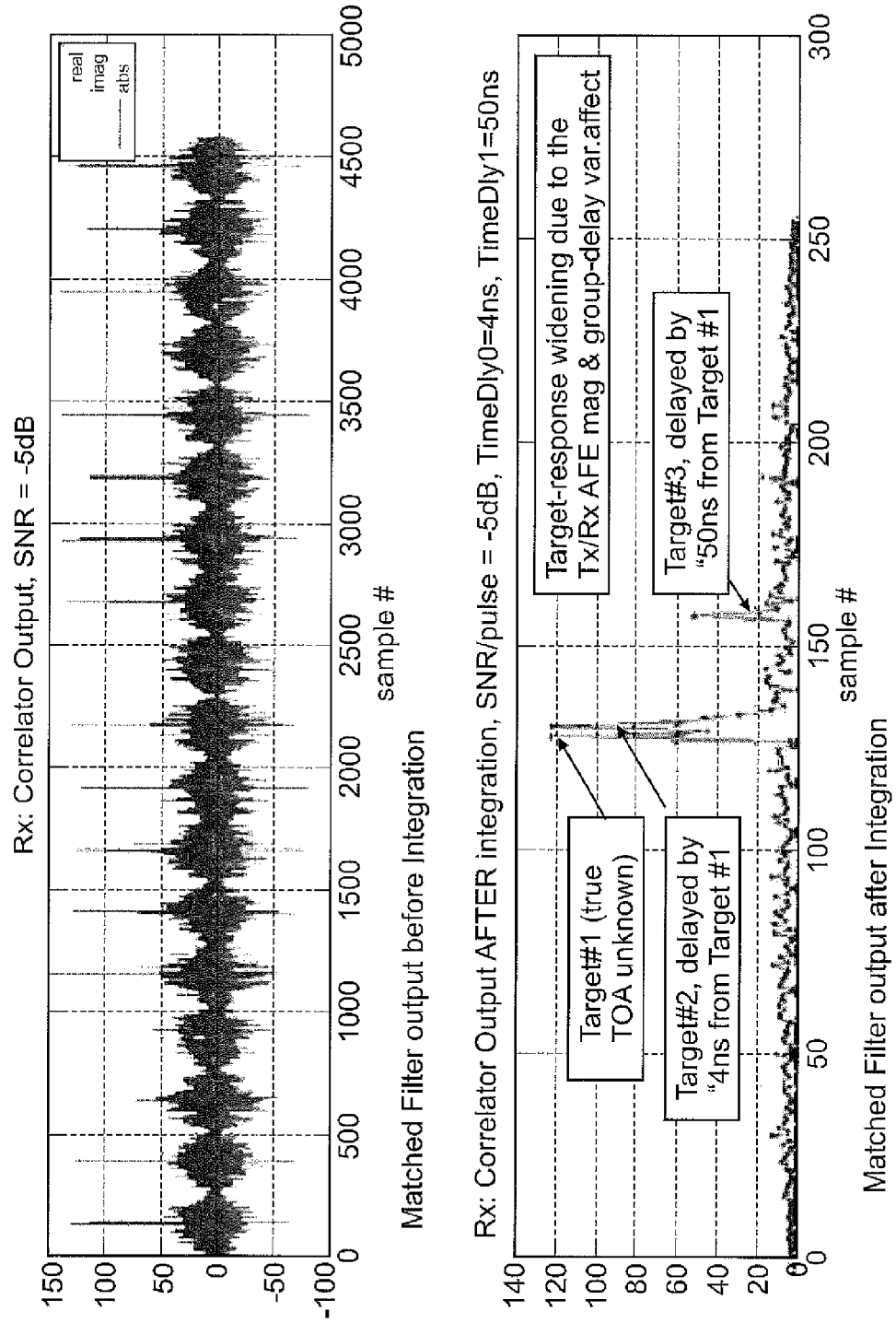
Figure 6:
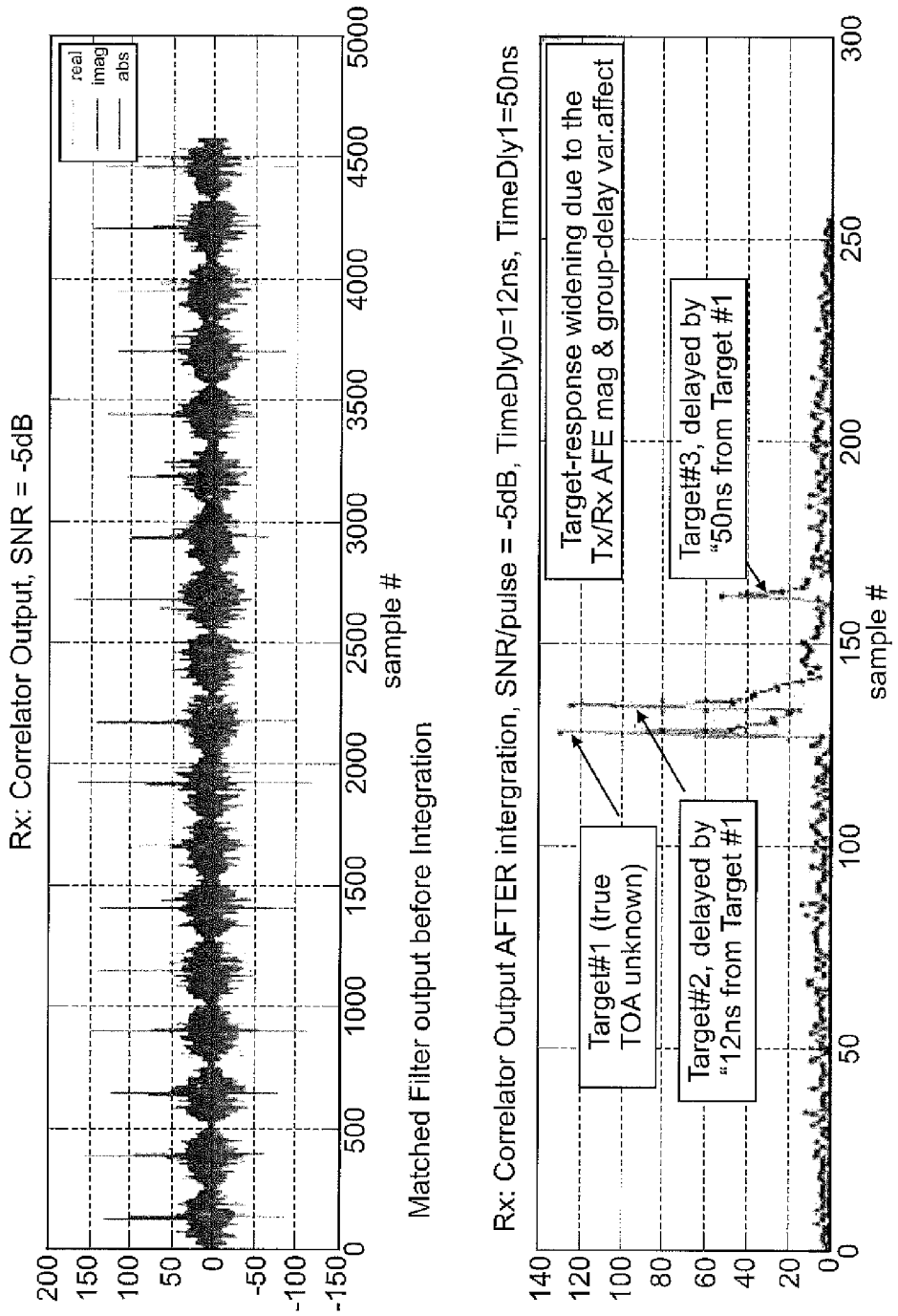

FIGS. 4, 5, and 6 are each a pair of plots of magnitude vs. sample number for eighteen consecutive correlated symbols before (top) and after (bottom) integration of matched filter output. The differences among FIGS. 4, 5, and 6 illustrate an example of the effects of different target distances and timing relationships between signals, in accordance with the first example embodiment. Matched filter output (e.g., magnitude response 138 output from matched filter 134), before and after integration of 18 consecutive correlated symbols is shown in FIG. 4, FIG. 5, and FIG. 6 corresponding, respectively, to three different sets of $t_0$ and $t_1$. FIG. 4 shows $t_0$=2 ns and $t_1$=50 ns; FIG. 5 shows $t_0$=4 ns and $t_1$=50 ns; and FIG. 6 shows $t_0$=12 ns and $t_1$=50 ns.

The matched filter 134 output, before correlated symbol integration, is the pulse compressed signal, even though the OFDM symbol duration is much greater than the time-delays between multiple radar reflection responses. The SNR of the pulse-compressed signal can be enhanced by summing the successive correlated symbols (in this example, there are 18 successive correlated symbols). The enhanced SNR is illustrated by the magnitude of the "pulse-integrated" waveforms in the bottom plots of FIG. 4, FIG. 5, and FIG. 6. The improved radar range resolution, especially in resolving reflections separated by more than 2 ns, can be clearly seen in FIGS. 5 and 6. The resolution can be somewhat degraded for closely spaced targets due, for example, to magnitude and group-delay variation of the band-limited frequency responses of the RF front-end filtering. However, since the range resolution is approximately 1 ft, corresponding to instantaneous modulation bandwidth of 503.25 MHz, the reflections separated by less than 1 ft cannot be resolved by the current WiMedia™ receiver architecture. In order to obtain the SNR increase by pulse integration, the timing synchronization between successive correlated symbols has to be met, and that may be ensured by the timing and frequency synchronization and tracking algorithms in the WiMedia™ receiver architecture via the preamble symbols and pilot tones.

The waveforms obtained after the pulse integration of successive correlated symbols at the matched filter 134 output may be used for radar ranging and imaging of stationary or moving targets. For moving target detection and imaging, responses from stationary objects may be filtered out appropriately from the successive waveforms. Additional band-pass filtering may also be applied to help improve the SNR of each motion-filtered waveform.

After the pulse integration of successive correlated symbols at the matched filter 134 output, the update rate of the radar waveforms may be computed. Using the parameters for the first example embodiment: samples per OFDM-symbol=165 (maximum range=312.4935 ns or 153.79 ft) after ZPS removal; pulse integration factor=18, as in the above example; number of samples per waveform=165×18=2970; and ADC output sample rate=512 Msps, it may be computed that the frequency in (radar waveforms/sec)=(samples/sec)/(samples/waveform)=512e6/2970≈172 KHz. This waveform update rate is significantly faster than, for example, 15 Hz that is typically available from other commercially available radar sensor products. High update rate is desirable especially for detecting fast moving targets. Otherwise, targets with Doppler speed greater than the update rate will appear as slower moving targets.

Figure 7:
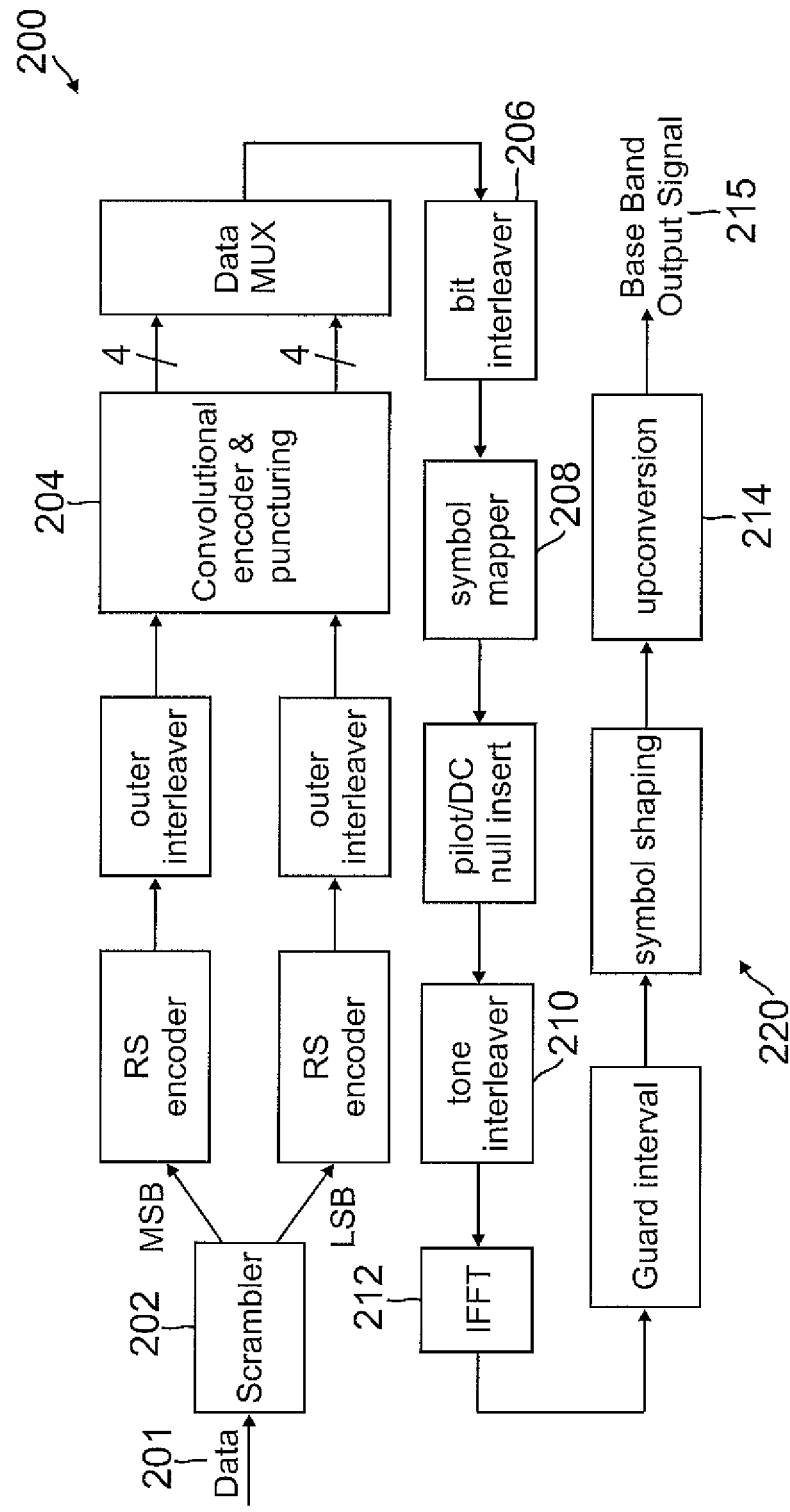
FIG. 7 is a system block diagram of an example of part of an OFDM radio transmitter in accordance with another embodiment.

FIG. 7 illustrates a transmitter portion of a radar system 200 using an OFDM radio transmitter 220 in accordance with a second example embodiment. In the second example embodiment, WirelessHD® millimeter-wave radio as UWB radar may be implemented similarly to WiMedia™ OFDM radio as radar in the first example embodiment. Two data rate modes are supported in WirelessHD®, one high rate PHY (HRP) and the other low rate PHY (LRP). The HRP mode may be more useful because it corresponds to an occupied bandwidth of 1.76 GHz that is desirable for high range-resolution radar ranging and imaging. The occupied bandwidth for the LRP mode is only 92 MHz and is mainly used for control and signaling. FIG. 7 illustrates an implementation block diagram of the transmitter baseband in the HRP mode.

As shown in FIG. 7, radar system 200 may include a scrambler unit 202 that receives information bits 201 as input. Information bits 201 provided at a physical layer service access point (PHY-SAP) may be "known" or accessible to a radar receiver 230 (see FIG. 8). A transmitter portion 220 of radar system 200 may also include a convolutional encoder/puncturer 204, bit interleaver 206, symbol mapper 208, tone interleaver 210, inverse fast Fourier transform (IFFT) module 212, and upconverter 214, with each module providing its output to the input of the next module, as shown in FIG. 7, with and upconverter 214 providing a baseband output signal 215 at its output as shown. The upconverter 214 may adjust the sampling rate before the signal goes to the digital-to-analog converter (DAC).

A brief summary of the second example embodiment of UWB radar ranging at 5 GHz center frequency using the millimeter-wave HRP front-end hardware is to first down-convert (221) the millimeter-wave transmitted signal to 5 GHz (for example—or to another suitable center frequency) before transmission, up-convert (224) the received signal (e.g., radar echo) to millimeter-wave center frequency as supported in the WirelessHD® specifications, then use the existing millimeter-wave and baseband hardware (e.g., SoC) for possible radar applications. Signal transmission and reception at 5 GHz may provide less attenuation through dielectric walls such as concrete, brick, and gypsum, as compared to attenuation at some millimeter-wave frequencies. If the RF chip to be used comes from the vendor with integrated beam-forming antennas, then signal transmission and reception at around 5 GHz (or some other center frequency lower than millimeter-wave frequencies) may not be possible or economically practical. In that case, the target detection may be performed using a millimeter-wave radar, and hence be limited to scenarios where the target location (depth) is shallow behind the surface (for example, ground or wall). The allowable transmission power (EIRP) at millimeter-wave, however, is much higher than that at 5 GHz by at least 30 dBm (measured power referenced to one milliwatt (mW)), and that may compensate for the increased path loss at millimeter-wave frequencies.

Assuming the raw sample at the output of the ADC in the HRP mode are accessible, the next step for radar ranging may be to apply a pulse-compression (matched filtering) technique on the received payload symbols in the baseband, following the same approach described for the first example embodiment using a WiMedia™ system. The magnitude responses of the pulse-compressed signals may provide high range-resolution that can be used for moving or static target detection.

Figures 8, 9:
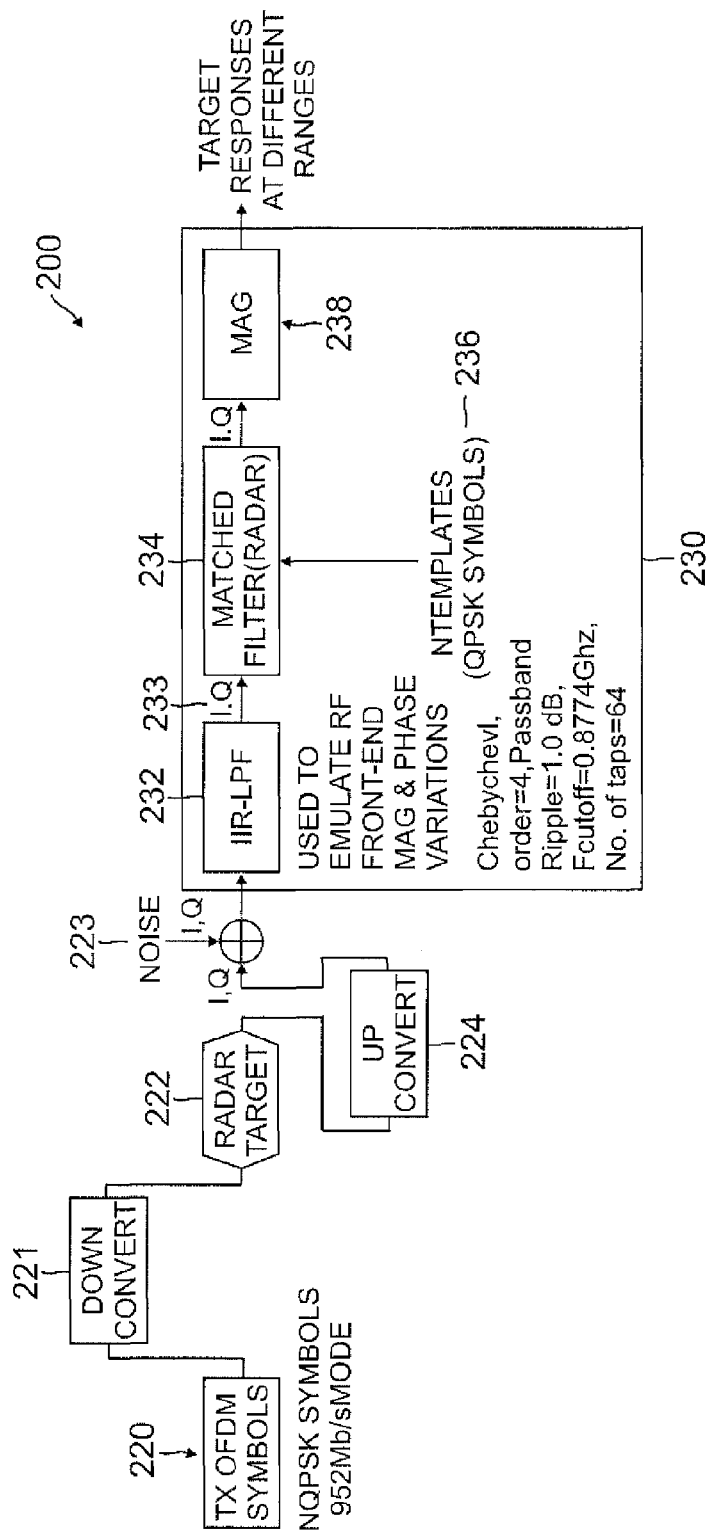
FIG. 8 is a block diagram showing a radar system and radar ranging operation utilizing OFDM radio in accordance with another embodiment.
FIG. 9 is a table showing a packet format for WirelessHD® OFDM radio as radar in accordance with another embodiment.

Similar to the approach for the WiMedia™ system, a significant feature employed by the second example embodiment using WirelessHD® is that the information bits 201 provided at the PHY SAP (labeled "Data" in FIG. 7) for transmission is known to the radar receiver 230 (see FIG. 8). The "Data" information bits 201 may be provided in a media access control (MAC) protocol data unit (MPDU). The frame format for the "Data" information bits 201 for WirelessHD® is different from that used in the WiMedia™ system, and is shown in FIG. 9. Based on the information bits 201, the corresponding OFDM symbol templates can be generated via an IFFT from the specific scrambled, encoded and interleaved bits at the tone interleaver 210 output.

Transmitter 220 may be implemented using ASIC. In the transmitter 220 ASIC, the tone interleaver 210 output bit sequence may not be accessible. Based on the WirelessHD® specifications, however, for the scrambler 202, convolutional encoder/puncturer 204, bit interleaver 206, symbol mapper 208, and tone interleaver 210, it should be possible to generate the expected bit sequence a priori at the output of the tone interleaver 210 for a specific bit sequence 201 provided at the PHY SAP, that would match the tone interleaver 210 output in the hardware. Once the specific bit pattern at the tone interleaver 210 output is generated, QPSK or 16-QAM modulation can be applied to the bits prior to the IFFT for a given raw data rate. The analysis presented for this second example embodiment is based on the lowest WirelessHD® data rate mode of 0.952 Gbps (HRP mode index 0) that utilizes QPSK modulation. Unlike the WiMedia™ specifications, however, there is no FDS or TDS for the lowest data rate. Hence, N distinct templates need to be used for matched filtering on the corresponding N received OFDM symbols—at the possible cost of some increase in implementation complexity of storing more templates in memory.

FIG. 8 illustrates system 200 and analysis for implementation of a second example embodiment of a radar system 200 utilizing OFDM radio transmitter 220 and receiver 230. The following parameters and conditions are assumed for the analysis of the second example embodiment of OFDM radio as UWB radar based on WirelessHD® specifications.

High Rate PHY (HRP)
Occupied Bandwidth=1.76 GHz, implying an improved radar range resolution is 3.35 inches compared to 12 inches for the WiMedia™ system
Total number of subcarriers=512
  336 Data subcarriers
  16 Pilot subcarriers
  3 DC subcarriers
  157 null subcarriers
Subcarrier frequency spacing=4.957 MHz
IFFT (transmitter) and FFT (receiver) period=242.24 ns
Number of samples in guard-interval=64 ($N_{G1}$)
Symbol period=226.95 ns (including $N_{G1}$ samples)
HRP mode 0—
  0.952 Gbps
  QPSK modulation
  Coding mode—EEP, rate 1/3 (inner); RS (224,216), rate 0.96 (outer)
  Payload ~200 microseconds long, with 7 sub-packets per frame
  Octets per frame=23458 for HRP mode 0
  Minimum required SNR=0.5 dB for HRP mode 0

Although the second example embodiment uses the lowest WirelessHD® data rate, OFDM radio as UWB radar implementations may also be provided using the transmitted payload symbols corresponding to other HRP data rates and coding, such as 1.904 Gbps; and 3.807 Gbps. One way to improve resolution for high resolution radar-ranging algorithms may be to bond channels together such as by using, for example, a pair of approximately 2 GHz channels. Channel bonding may be featured, for example, in the specification of WirelessHD® and in 60-GHz communication standards other than WirelessHD®. Channel bonding may be used, for example, to achieve data rates on the order of 25 Gbps (e.g., using 4 channels).

In addition to the significant feature employed by the second example embodiment that the specific bit pattern at the tone interleaver 210 output can be constructed based on the specific HRP-MPDU data 201 at the scrambler 202 input, some further features that may be employed by the second example embodiment of radar system 200 of OFDM radio for UWB-radar ranging are:

Feature 1) Samples may be extracted at the output of the ADC in the receiver PHY-SoC from a particular WirelessHD® vendor. These samples are used to generate the UWB radar pulses for ranging and imaging.

Feature 2) The ADC output samples may be extracted at the rate of 2.538 Gsps, via an appropriate interface to a suitable FPGA or DSP processor for real-time processing.

Feature 3) The start of the extracted samples from the ADC output should correspond to the start of the frame payload symbols. This synchronization may allow the removal of cyclic prefix (CP) (similar to ZPS zero padded suffix in WiMedia™ PHY) per OFDM payload and, thereby, the matched filtering to take place only on the data samples past the CP. This information on start of frame payload ensures that no ADC samples corresponding to HRP preamble and HRP header are used for the radar matched filtering. A variety of functions are served by the HRP preamble, such as initial timing synchronization, carrier frequency offset coarse and fine estimation and compensation, channel estimation, and AGC automatic gain control. Furthermore, capturing the ADC output samples corresponding to the beginning of the frame payload ensures the suitable gain control to the ADC full-scale has been applied via the AGC algorithms. Data collection corresponding to beginning and end of the frame payload can be controlled by the MAC layer. If the information on the beginning of the frame payload is not available, but timing information at a specific sample or samples in the preamble or header is available instead, the beginning sample of the frame payload can be obtained based on the a priori knowledge of the specific samples (e.g., symbols) constituting packet/frame synchronization sequence and channel estimation sequence in a preamble, or specific samples (symbols) constituting an HRP header.

Feature 4) Ranging (time of arrival) functionality, as with a WiMedia™ system, may be required if the true time of arrival of the first radar reflections from a scatterer (e.g., stationary or moving radar target) is needed. The subsequent radar ranging information from other scatterers (stationary or moving), time-delayed relative to the first response, can still be obtained from the pulse compression algorithm output signal, regardless of whether the ranging functionality is available or not. The ranging functionality may be supported by the MAC and PHY layers. In addition, this feature may help determine the absolute time of arrival (TOA) of the scatterers when the transmitter and receiver are in monostatic radar mode or bistatic radar mode. The delayed reflection responses from other scatterers and their relative timing with respect to the first TOA, will be available from the matched filter output in the radar receiver 230. If the ranging functionality is not supported by an SoC, then the antenna coupling between the transmitter and the receiver antennas may be used as the initial radar-range time reference, based on which delayed radar ranges from multiple scatterers (stationary or static) can be extracted from the pulse compression (matched filter) algorithm output.

Returning to FIG. 8, system operation for UWB radar-ranging, in the baseband, is shown for a second example embodiment of a radar system 200 utilizing an OFDM radio transmitter 220 and a receiver 230. Transmitter 220—labeled "TX OFDM SYMBOLS"—may transmit the transmitted frame payload. Radar target 222 may be a scatterer of the transmitted radar signal, which may be, for example, either stationary (e.g., walls, ground surface, or ground-buried targets) or moving (e.g., persons, animals). Assuming that the ADC output samples correspond to the beginning of the frame payload, the samples contain wireless channel multipath or radar-echo responses, as well as band-limited magnitude and phase responses of the transmitter 220 and receiver 230 RF front end 232. Such RF front-end magnitude and phase variation may be calculated using IIR low pass filter parameters to represent receiver RF front end 232. For the second example embodiment, IIR-LPF of receiver RF front end 232 may comprise a Chebyshev type I filter, with order=4, pass-band ripple=1.0 dB, cut-off frequency at 0.8774 MHz, and 64-tap impulse response.

Matched filter 234—labeled "MATCHED FILTER (RADAR)"—may include a matched filtering or pulse compression technique applied to OFDM symbols 233 output, for example, by a receiver front end 232. For the matched filter templates 236, the OFDM symbols corresponding to the tone interleaver 210 output (in the transmitter 220), known a priori, may be used. These template symbols 236 do not contain the CP. The matched filter 234 serves as pulse compressor—e.g., although the OFDM symbols at the filter input are much longer than the relative time-delays between radar echoes, the filter output exhibits strong, correlated responses (I and Q) with width approximately equal to the reciprocal of 1.76 GHz, roughly equal to the radar range resolution of 3.35 inches. The magnitude response $(I^2+Q^2)$ 238 at the matched filter 234 output provide the high-resolution signals that may be processed further for estimating radar-target locations as well as target (stationary or moving) imaging. In this particular case, there are N distinct template symbols for N corresponding received symbols.

For the second example embodiment, the complex-valued impulse response h[n] of the target echoes (equivalent baseband modeling) has been chosen to be:

$$h[n] = [\{(1+j)/\sqrt{2}\}\cdot\delta[n]\{(1-j)/\sqrt{2}\}\cdot\delta[n-n_0] + \{(-1-j1)/\sqrt{2}\}\cdot\delta[n-n_1]]$$

where $n_0$ and $n_1$ denote the sample index corresponding to the time delays of the first and second echoes (reflections) with respect to the first reflection. For analysis, time delays $t_0$ and $t_1$ have been selected, from which $n_0$ and $n_1$ are computed using the formula: $n_i$=flood[$t_i$/dt], where dt=$T_{sym}$/N=(1/df)/N=(1/4.957e6)/512=394.0135e-12 sec, and i=0, 1.

Figure 10:
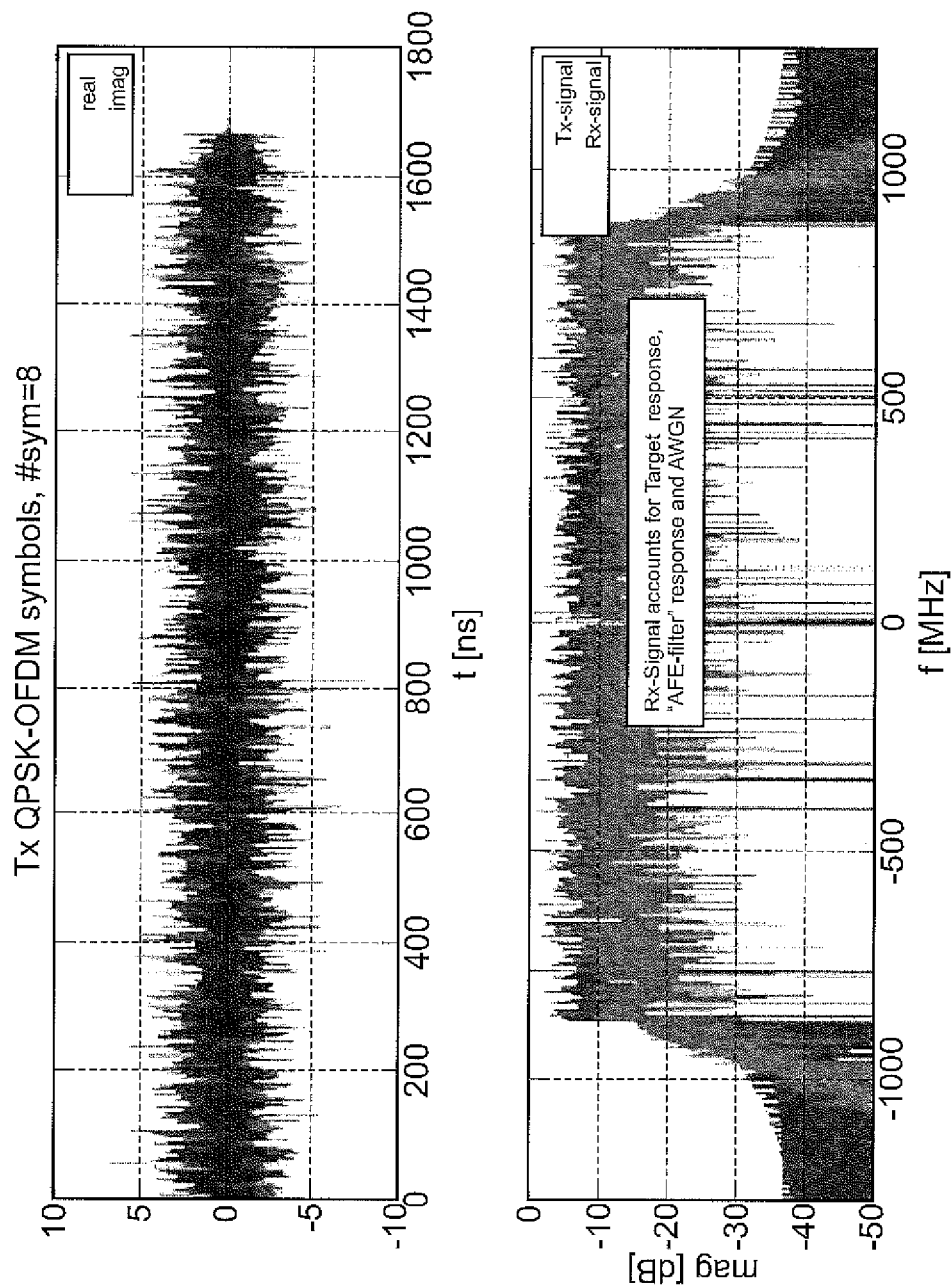
FIG. 10 is a magnitude vs. time plot for transmitted OFDM symbols (top) and magnitude vs. frequency plot of response of corresponding transmitted and received symbols including target and filter response, and noise (bottom) in accordance with another embodiment.

FIG. 10 is a pair of magnitude plots for the second example embodiment. Eight complex valued (e.g., I, Q pairs), transmitted OFDM symbols (e.g., downconverted millimeter wave signals 215) are shown in the top plot of FIG. 10. The bottom plot of FIG. 10 shows the magnitude frequency response of corresponding transmitted and received symbols. The received symbols, convolved with target impulse response, "AFE-filter" impulse response, and with AWGN noise 223 (see FIG. 8) are also shown. For the particular 0.952 Gbps rate for the second example embodiment, the minimum SNR at the receiver RF front-end input required for a specified bit error rate (BER) for data communication is approximately 0.5 dB. Assuming that the same SNR would be appropriate for detecting targets with a low probability of false alarms, the noise variance in the AWGN 223 may be set accordingly for analysis. The spectral dips in the received signal frequency response seen in the bottom plot of FIG. 10 are apparent due to target and "AFE-filter" impulse responses.

Figure 11:
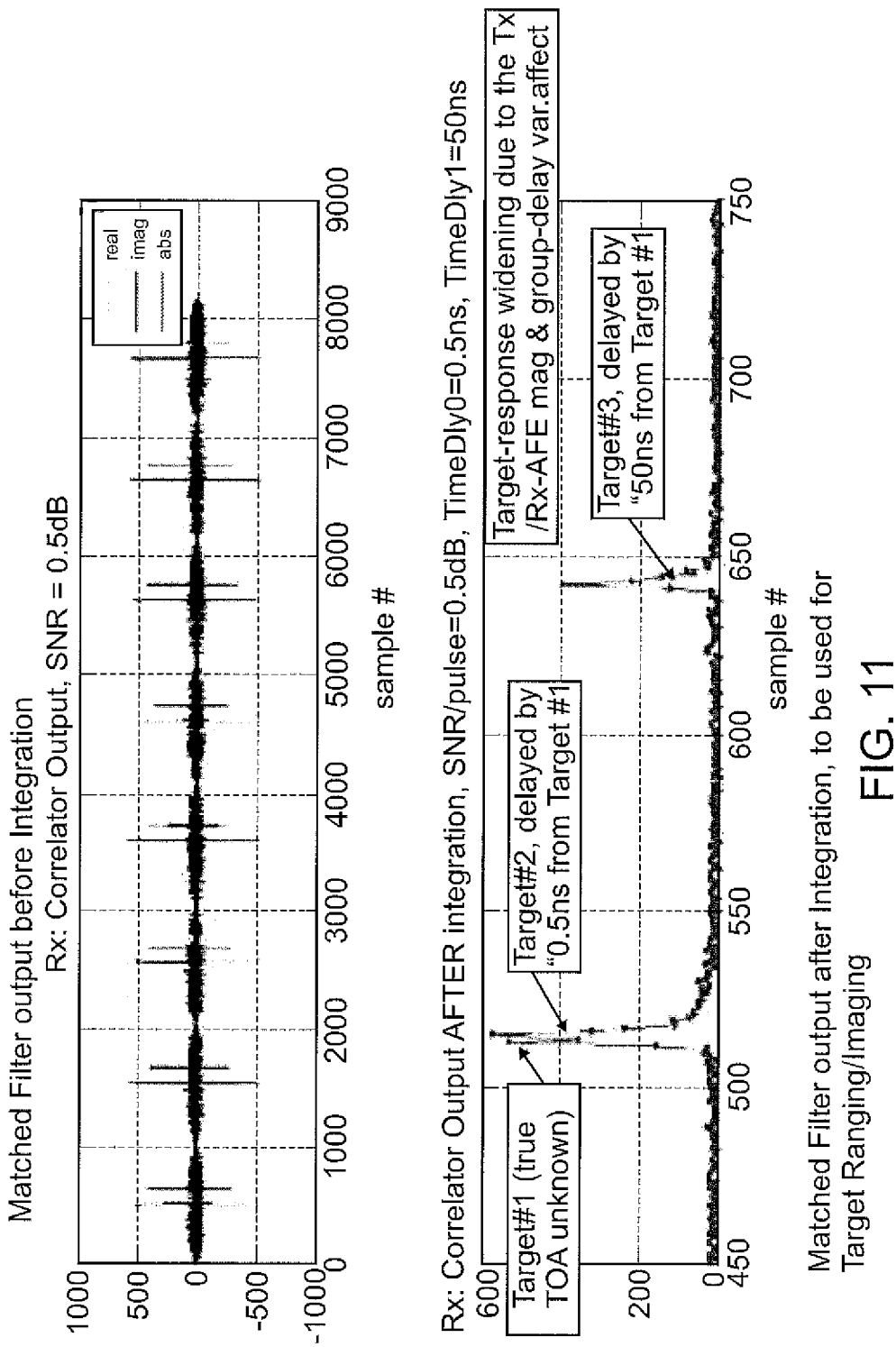
FIGS. 11 and 12 are each a pair of magnitude vs. sample number plots for eight consecutive correlated symbols before (top) and after (bottom) integration of matched filter output, the different figures showing an example of the effects of different target distances and timing relationships between signals, in accordance with another embodiment.
Figure 12:
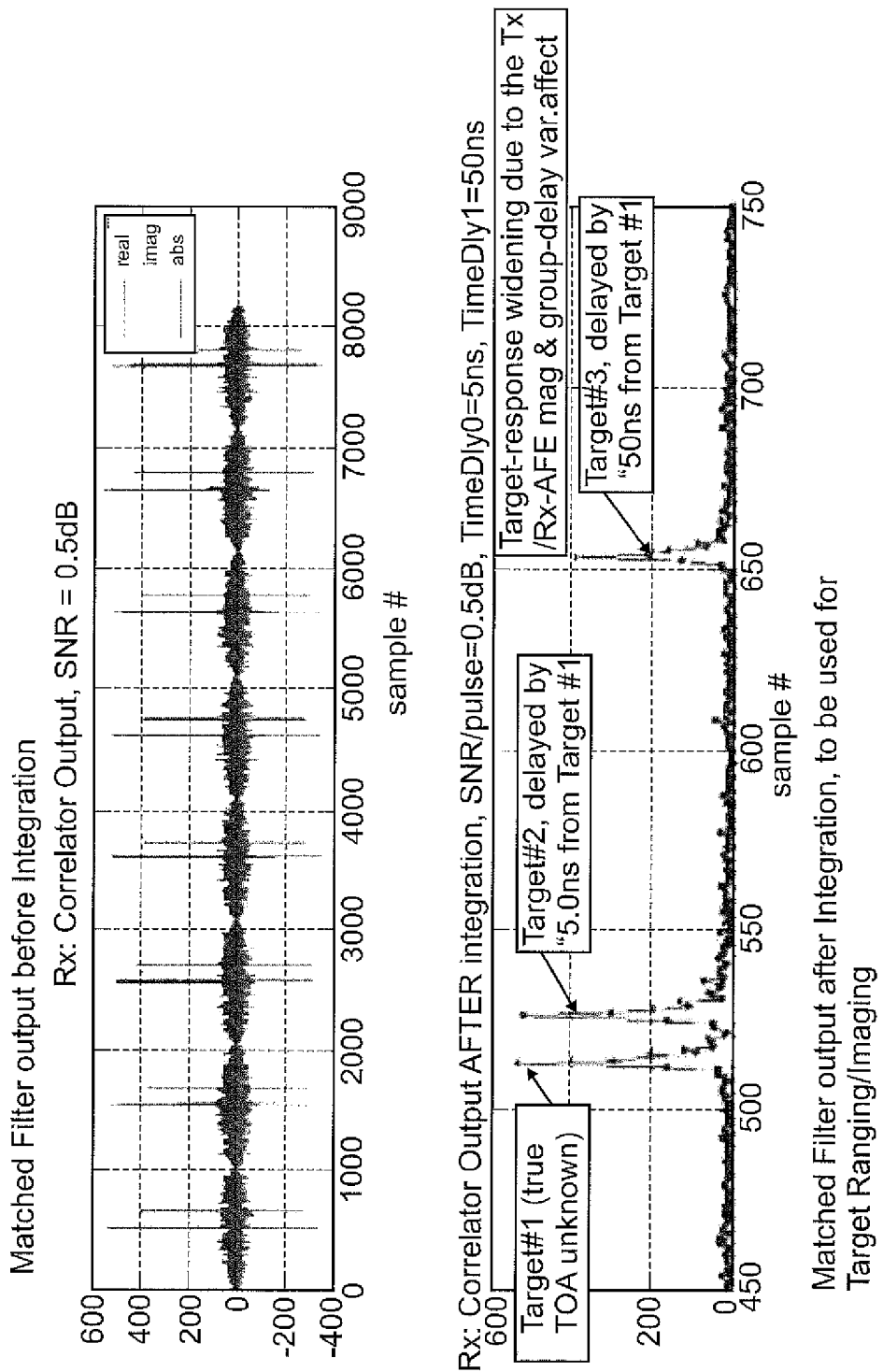

FIGS. 11 and 12 are each a pair of plots of magnitude vs. sample number for eight consecutive correlated symbols before (top) and after (bottom) integration of matched filter output. The differences between FIGS. 11 and 12 illustrate an example of the effects of different target distances and timing relationships between signals, in accordance with the second example embodiment. Matched filter 234 output (e.g., magnitude response 238 output from matched filter 234), before and after integration of 8 consecutive correlated symbols is shown in FIG. 11 and FIG. 12 corresponding, respectively, to two different sets of $t_0$ and $t_1$. FIG. 11 shows $t_0=0.5$ ns and $t_1=50$ ns; and FIG. 12 shows $t_0=5$ ns and $t_1=50$ ns.

The matched filter 234 output, before correlated symbol integration, is the pulse compressed signal, even though the OFDM symbol duration is much greater than the time-delays between multiple radar reflection responses. The SNR of the pulse-compressed signal can be enhanced by summing the successive correlated symbols (in this second example, there are 8 successive correlated symbols). The enhanced SNR is illustrated by the magnitude of the "pulse integrated" waveforms seen in the bottom plots of FIG. 11 and FIG. 12. The improved radar range resolution compared to the WiMedia™ system may be observed for both scenarios, especially in resolving reflections separated by 0.5 ns. The resolution can be somewhat degraded for such closely spaced targets due, for example, to magnitude and group-delay variation of the band-limited frequency responses of the RF front-end filtering. In order to obtain the SNR increase by pulse-integration, the timing synchronization between successive correlated symbols has to be met, and that may be ensured by the timing and frequency synchronization and tracking algorithms in the WirelessHD® receiver architecture via the preamble symbols and pilot tones.

The waveforms, obtained after the pulse integration of successive correlated symbols at the matched filter 234 output may be used for radar ranging and imaging of stationary or moving targets. For moving target detection and imaging, responses from stationary objects may be filtered out appropriately from the successive, integrated waveforms. Additional band-pass filtering also may be applied to help improve the SNR of each motion-filtered waveform.

After the pulse integration of successive correlated symbols at the matched filter 234 output, the update rate of the radar waveforms may be computed. Using the parameters for the second example embodiment: samples per OFDM-symbol=512+64 (maximum range=226.95 ns or 111.7 ft) after CP removal; pulse integration factor=8, as in the above example; number of samples per waveform=576×8=4608; and ADC output sample rate=2538 Msps, it may be computed that the frequency in (radar waveforms/sec)=(samples/sec)/(samples/waveform)=2538e6/2970≈551 KHz. This waveform update rate is significantly faster than, for example, 15 Hz that is typically available from other commercially available radar sensor products. High update rate is desirable especially for detecting fast moving targets. Otherwise, targets with Doppler speed greater than the update rate will appear as slower moving targets.

Embodiments described herein illustrate but do not limit the disclosure. It should also be understood that numerous modifications and variations are possible in accordance with the principles of the present disclosure. Accordingly, the scope of the disclosure is best defined only by the following claims.

We claim:

1. A radar system comprising:
   an orthogonal frequency division multiplexing (OFDM) radio communications transmitter configured to transmit information bits using one or more payload symbols in a transmitted signal;
   a downconverter applied to the transmitted signal for transmitting pulses in a UWB wave band;
   an upconverter applied to a received signal reflected from a target; and
   a receiver configured to:
     construct the payload symbols from the information bits provided by the transmitter;
     receive the payload symbols in the received signal reflected from the target;
     apply a matched filter to the received payload symbols using the constructed payload symbols as a template; and
     process a magnitude response at an output of the matched filter for estimating location and imaging of the target.

2. The radar system of claim 1, wherein the radar receiver is further configured to apply a pulse integration at the output of the matched filter.

3. The radar system of claim 1, wherein applying the matched filter to the received payload symbols comprises applying a pulse compression technique to the payload symbols.

4. The radar system of claim 1, wherein:
   the information bits are provided at a physical layer service access point (PHY SAP);
   the information bits from the PHY SAP comprise at least one of a physical-layer convergence protocol (PLCP) service data unit (PSDU) or a media access control (MAC) protocol data unit (MPDU) provided to a scrambler input; and
   the template comprises an OFDM symbol generated from the specific scrambled, encoded, and interleaved bit pattern at an interleaver output or OFDM modulator input of the transmitter, the specific bit pattern corresponding to a specific PSDU or MPDU data at the scrambler input.

5. The radar system of claim 1, wherein the received payload symbols are generated from samples extracted at an output of an analog-to-digital converter (ADC) in a receiver physical-layer system on chip (PHY-SoC).

6. The radar system of claim 5, wherein the samples at the ADC output are extracted at a rate of at least 512 Msps via an interface to a digital signal processor for real-time processing.

7. The radar system of claim 5, wherein a start of the extracted samples from the ADC output corresponds to a start of frame payload symbols of a PSDU so as to provide a synchronization allowing removal of zero padded suffix (ZPS) samples per OFDM payload so that the matched filter applies only on data samples exclusive of the ZPS.

8. The radar system of claim 1, wherein a ranging functionality of the OFDM transmitter and receiver is used to provide a true time of arrival of an initial transmitted signal reflection from a scatterer.

9. The radar system of claim 1, wherein:
the received payload symbols are generated from samples extracted at an output of an analog-to-digital converter (ADC) in a receiver physical-layer system on chip (PHY-SoC); and
the samples at the ADC output are extracted at a rate of at least 2.538 Gsps via an interface to a digital signal processor for real-time processing.

10. The radar system of claim 9, wherein:
a start of the extracted samples from the ADC output corresponds to a start of frame payload symbols of an MPDU so as to provide a synchronization allowing removal of a cyclic prefix (CP) per OFDM payload so that the matched filter applies only on data samples exclusive of the CP.

11. The radar system of claim 1, wherein an antenna coupling between an antenna of the OFDM transmitter and an antenna of the receiver is used to provide a true time of arrival of an initial transmitted signal reflection from a scatterer.

12. A method comprising:
transmitting an orthogonal frequency division multiplexing (OFDM) modulated signal comprising information bits conveyed by one or more payload symbols;
constructing the payload symbols from the information bits provided to a receiver;
receiving the payload symbols in a recieved signal reflected from a target;
generating the received payload symbols from samples extracted at the output of an analog-to-digital converter (ADC) in a receiver physical-layer system on chip (PHY-SOC), wherein:
the transmitted signal is downconverted from a millimeter wave band to a UWB wave band; and
the received signal reflected from the target is upconverted;
applying matched filtering to the received payload symbols using the constructed payload symbols as a template, wherein:
a start of the extracted samples from the ADC output corresponds to a start of frame payload symbols of an MPDU so as to provide a synchronization allowing removal of a cyclic prefix CP per OFDM payload so that the matched filter applies only on data samples exclusive of the CP; and
processing a magnitude response at a matched filter output to produce a range estimate of the target.

13. The method of claim 12, further comprising processing a magnitude response at a matched filter output to produce imaging of the target.

14. The method of claim 12, further comprising apply a pulse integration technique to the output of the matched filter to improve signal-to-noise ratio (SNR).

15. The method of claim 12, further comprising:
providing the information bits at a physical layer service access point (PHY SAP) of an OFDM transmitter;
providing the information bits in at least one of a physical-layer convergence protocol (PLCP) service data unit (PSDU) or a media access control (MAC) protocol data unit (MPDU) to a scrambler input; and
constructing the templates for matched filtering from OFDM symbols generated from the specific scrambled, encoded, and interleaved bit pattern at an interleaver output or OFDM modulator input of the transmitter, wherein the specific bit pattern corresponds to a specific PSDU or MPDU data at the scrambler input.

16. The method of claim 12, wherein a start of the extracted samples from the ADC output corresponds to a start of frame payload symbols of a PSDU so as to provide a synchronization allowing removal of zero padded suffix (ZPS) samples per OFDM payload so that the matched filter applies only on data samples exclusive of the ZPS.

17. An orthogonal frequency division multiplexing (OFDM) radio comprising:
an OFDM radio communications transmitter configured to:
transmit information bits using one or more payload symbols in a transmitted signal; and
provide the information bits from a physical layer service access point (PHY SAP);
a downconverter applied to the transmitted signal for transmitting pulses in a UWB wave band;
an upconverter applied to a received signal reflected from a target; and
a receiver configured to:
construct the payload symbols from the information bits provided by the transmitter;
receive the payload symbols in the received signal reflected from the target;
apply a matched filter to the received payload symbols using the constructed payload symbols as a template; and
process a magnitude response at the matched filter output for ranging and imaging of the target.

* * * * *